United States Patent
Guo et al.

(10) Patent No.: US 9,641,737 B2
(45) Date of Patent: May 2, 2017

(54) METHOD AND DEVICE FOR TIME-DELAY PHOTOGRAPHING

(71) Applicant: Xiaomi Inc., Beijing (CN)

(72) Inventors: Chong Guo, Beijing (CN); Ling Zhu, Beijing (CN); Haipo Zhang, Beijing (CN); Xiaolong Chen, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 14/724,629

(22) Filed: May 28, 2015

(65) Prior Publication Data

US 2016/0050352 A1 Feb. 18, 2016

Related U.S. Application Data

(63) Continuation of application No. PCT/CN2015/071249, filed on Jan. 21, 2015.

(30) Foreign Application Priority Data

Aug. 14, 2014 (CN) .......................... 2014 1 0400811

(51) Int. Cl.
*H04N 5/232* (2006.01)
(52) U.S. Cl.
CPC ......... *H04N 5/232* (2013.01); *H04N 5/23216* (2013.01); *H04N 5/23293* (2013.01)
(58) Field of Classification Search
CPC ............. H04N 1/2125; H04N 5/23216; H04N 1/00408; H04N 1/00411; H04N 1/00413; H04N 1/00416; H04N 1/00501; H04N 13/0484; G06F 3/005; G06F 3/048; G06F 3/013; G08B 13/19678; G08B 13/1968; G08B 13/19682; G05B 2219/35503
See application file for complete search history.

(56) References Cited

U.S. PATENT DOCUMENTS

| | | | |
|---|---|---|---|
| 7,561,201 B2 | 7/2009 | Hong | |
| 8,146,003 B2 | 3/2012 | Gruen et al. | |
| 8,146,124 B2 | 3/2012 | Kitagawa | |
| 2006/0072028 A1 | 4/2006 | Hong | |

(Continued)

FOREIGN PATENT DOCUMENTS

| | | |
|---|---|---|
| CN | 101621621 A | 1/2010 |
| CN | 102591586 A | 7/2012 |

(Continued)

OTHER PUBLICATIONS

International Search Report of PCT/CN2015/071249, mailed from the State Intellectual Property Office of China on May 4, 2015.

(Continued)

*Primary Examiner* — Mekonnen Dagnew
(74) *Attorney, Agent, or Firm* — Finnegan, Henderson, Farabow, Garrett & Dunner LLP

(57) ABSTRACT

A method for performing time-delay photographing, includes: displaying a photographing interface including a shutter operation control, wherein the shutter operation control further includes a shutter button and a time-setting region outside the shutter button; determining a delay time for photographing according to the time-setting region; and photographing according to the delay time.

17 Claims, 8 Drawing Sheets

(56) References Cited

U.S. PATENT DOCUMENTS

| | | | |
|---|---|---|---|
| 2008/0084398 A1* | 4/2008 | Ito | G06F 1/1626 345/173 |
| 2008/0122796 A1 | 5/2008 | Jobs et al. | |
| 2009/0033522 A1 | 2/2009 | Skillman et al. | |
| 2009/0040331 A1 | 2/2009 | Kitagawa | |
| 2012/0011456 A1* | 1/2012 | Noda | G03B 17/40 715/769 |
| 2013/0208163 A1 | 8/2013 | Choi et al. | |
| 2013/0257762 A1 | 10/2013 | Masuda | |
| 2014/0016921 A1* | 1/2014 | Choi | G03B 17/40 396/264 |
| 2014/0033100 A1 | 1/2014 | Noda et al. | |
| 2014/0036108 A1 | 2/2014 | Yoon et al. | |
| 2014/0223375 A1 | 8/2014 | Tarvainen et al. | |

FOREIGN PATENT DOCUMENTS

| | | |
|---|---|---|
| CN | 102681302 A | 9/2012 |
| CN | 103079004 | 5/2013 |
| CN | 103501412 | 1/2014 |
| CN | 103631333 A | 3/2014 |
| CN | 103856709 A | 6/2014 |
| CN | 103914303 A | 7/2014 |
| CN | 104182313 | 12/2014 |
| JP | 2005-121842 A | 5/2005 |
| JP | 2005-257869 A | 9/2005 |
| JP | 2007-286042 A | 11/2007 |
| JP | 2009-044251 A | 2/2009 |
| JP | 2010-028364 A | 2/2010 |
| JP | 2011129995 | 6/2011 |
| JP | 2012-018535 A | 1/2012 |
| JP | 2013-178317 A | 9/2013 |
| KR | 10-2014-0008023 | 3/2014 |
| RU | 2519481 C2 | 6/2014 |
| WO | WO 2010/071187 A1 | 6/2010 |
| WO | WO 2012/125383 A1 | 9/2012 |

OTHER PUBLICATIONS

Extended European Search Report for European Patent Application No. 15180263.4, from the European Patent Office, dated Jan. 4, 2016.

"AutoCamTimer on the App Store," dated Oct. 9, 2012. Retrieved from the Internet on Dec. 17, 2015. URL: https://itunes.apple.comjus/appjautocamtimerjid563403118?mt=8.

"Timer Auto-Camera—Set Seconds to Click Photo on the App Store," dated Jul. 4, 2014. Retrieved from the Internet on Dec. 17, 2015. URL: https://itunes.apple.comjusjapp/timerauto-camera-set-seconds/id415294299?mt=8.

J. Fitzpatrick, "Tick! Is a Super Simple Timer App for Android Phones," dated Dec. 26, 2010. Retrieved from: http://lifehacker.com/5717691/tick-is-a-super-simple-timer-app-for-android-phones.

English version of International Search Report of PCT/CN2015/071249, mailed from the State Intellectual Property Office of China on May 4, 2015.

* cited by examiner

METHOD AND DEVICE FOR TIME-DELAY PHOTOGRAPHING

CROSS-REFERENCE TO RELATED APPLICATIONS

This application is a continuation of International Application No. PCT/CN2015/071249, filed Jan. 21, 2015, which is based upon and claims priority to Chinese Patent Application No. 201410400811.0, filed Aug. 14, 2014, the entire contents of all of which are incorporated herein by reference.

TECHNICAL FIELD

The present disclosure generally relates to the field of computer technologies and, more particularly, to a method and a device for time-delay photographing.

BACKGROUND

Due to the popularity of mobile terminals having photographing functions, such as smart phones, tablet computers, users have increasingly higher expectations for the mobile terminals to be capable of performing time-delay photographing during selfie photographing, group photographing, and the like. Therefore, how to perform time-delay photographing becomes important to the development of mobile terminals.

Conventionally, a mobile terminal provides a menu setting interface for conducting time-delay photographing. The menu setting interface includes a time-delay button. When the user selects the time-delay button, the terminal displays a time-delay item that includes a plurality of time options corresponding to different delay times. The use then selects a time option, and the terminal performs time-delay photograph according to the selected time option. However, such usage of menu setting interface may be inefficient.

SUMMARY

According to a first aspect of the present disclosure, there is provided a method for performing time-delay photographing, comprising: displaying a photographing interface including a shutter operation control, wherein the shutter operation control further includes a shutter button and a time-setting region outside the shutter button; determining a delay time for photographing according to the time-setting region; and photographing according to the delay time.

According to a second aspect of the present disclosure, there is provided a device, comprising: a processor; and a memory for storing instructions executable by the processor; wherein the processor is configured to: display a photographing interface including a shutter operation control, wherein the shutter operation control further includes a shutter button and a time-setting region outside the shutter button; determine a delay time for photographing according to the time-setting region; and photograph according to the delay time.

According to a third aspect of the present disclosure, there is provided a non-transitory computer-readable storage medium storing instructions that, when executed by a processor of a device, cause the device to perform a method for time-delay photographing, the method comprising: displaying a photographing interface including a shutter operation control, wherein the shutter operation control further includes a shutter button and a time-setting region outside the shutter button; determining a delay time for photographing according to the time-setting region; and photographing according to the delay time.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of devices and methods consistent with some aspects related to the invention as recited in the appended claims.

Figure 1:
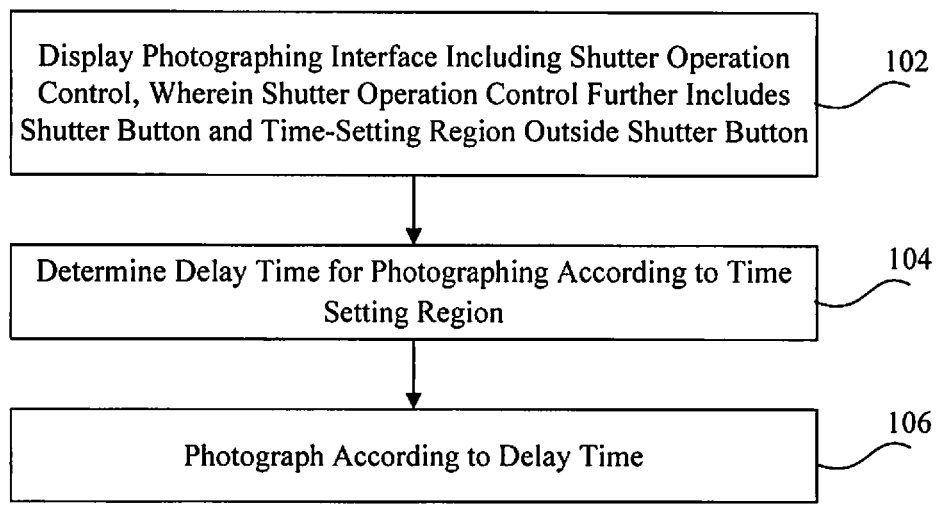
FIG. 1 is a flowchart of a method for time-delay photographing, according to an exemplary embodiment.

FIG. 1 is a flowchart of a method 100 for time-delay photographing, according to an exemplary embodiment. For example, the method 100 may be used in a terminal having a photographing function. The terminal may be a handset, a camera, etc. Referring to FIG. 1, the method 100 includes the following steps.

In step 102, the terminal displays a photographing interface. The photographing interface includes a shutter operation control. The shutter operation control further includes a shutter button and a time-setting region outside the shutter button.

In step 104, the terminal determines a delay time for photographing according to the time-setting region.

In exemplary embodiments, the time-setting region may include a preset number of subregions, and each subregion corresponds to a delay time. The determining of the delay time according to the time-setting region may further include: detecting one or more selected subregions in the time-setting region; and determining the delay time for photographing according to the one or more selected subregions.

In one exemplary embodiment, the time-setting region is an annular region surrounding the shutter button. The detecting of the one or more selected subregions in the time-setting region may include: detecting a rotary touch operation on the annular region; and determining the one or more selected subregions in the annular region according to the detected rotary touch operation.

In one exemplary embodiment, after detecting the one or more selected subregions in the time-setting region, the terminal may discriminatively display the one or more selected subregions and the unselected subregion(s) in the time-setting region.

In one exemplary embodiment, the photographing interface may include a camera icon. After determining the delay time for photographing according to the time-setting region, the terminal may display a time value of the delay time below the camera icon.

In step 106, the terminal performs photographing according to the delay time.

In one exemplary embodiment, the photographing according to the delay time may include: counting down the delay time from a current time; and photographing when the countdown ends. The counting down of the delay time may further include: gradually reducing the displayed time value of the delay time and the range of the one or more selected subregions in the time-setting region till the countdown ends.

Figure 2:
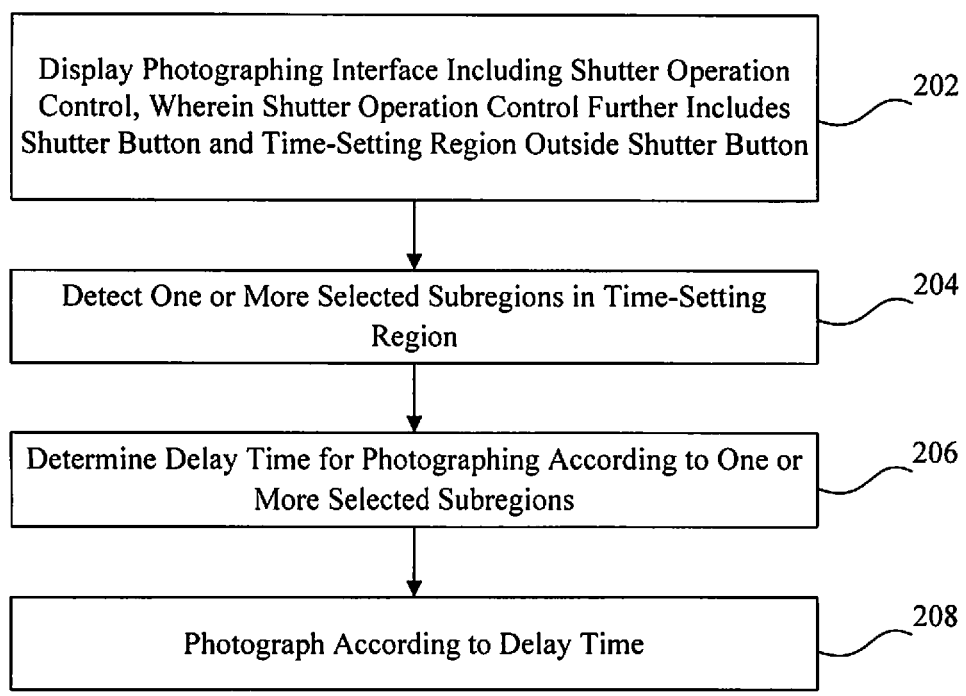
FIG. 2 is a flowchart of a method for time-delay photographing, according to an exemplary embodiment

FIG. 2 is a flowchart of a method 200 for time-delay photographing, according to an exemplary embodiment. For example, the method 200 may be used in a terminal having a photographing function. The terminal may be a smart phone, a tablet computer, a camera, etc. Referring to FIG. 2, the method 200 includes the following steps.

In step 202, the terminal displays a photographing interface. The photographing interface includes a shutter operation control. The shutter operation control further includes a shutter button and a time-setting region outside the shutter button.

In exemplary embodiments, the terminal has a camera and a display screen. The terminal may switch to a photographing mode after detecting the camera is turned on. The terminal then displays the photographing interface on the display screen.

The contents displayed in the photographing interface may include the shutter operation control, images captured by the terminal, and the like.

A ratio of the areas occupied by the shutter button and the time-setting region may vary in different embodiments. For example, the shutter button and the time-setting region may each occupy 50% of the area of the shutter operation control, or may occupy 60% and 40% of the area of the shutter operation control, respectively.

The shutter button is used for photographing. The shutter button may be displayed in the photographing interface in the form of an icon, a menu, and the like.

The time-setting region is used for setting the delay time for photographing. The time-setting region may be arranged as an annular region surrounding the shutter button. The time-setting region may further include a preset number of subregions, and each subregion corresponds to a delay time. The preset number may be five, six, ten, and the like. The size of each subregion may be the same or different. In some embodiments, all the subregions are equal in size and correspond to an identical delay time, so that users can conveniently use the subregions to set the delay time for photographing.

Figure 3:
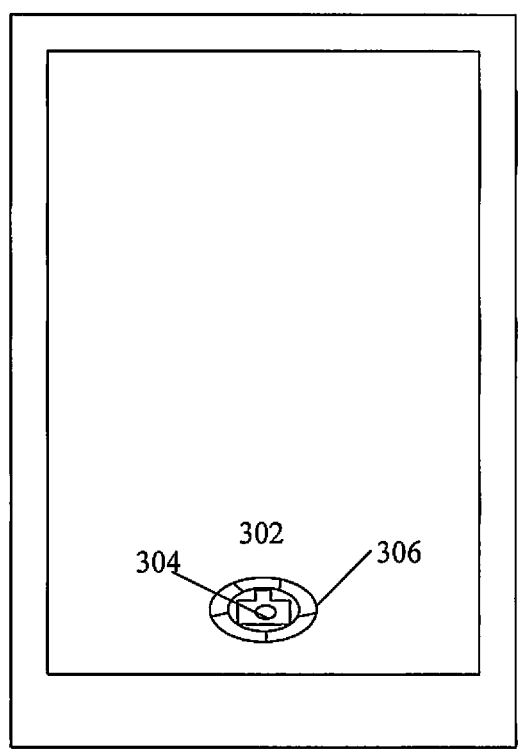
FIG. 3 is a schematic diagram illustrating a photographing interface, according to an exemplary embodiment.

FIG. 3 is a schematic diagram illustrating a photographing interface 300, according to an exemplary embodiment. Referring to FIG. 3, the photographing interface 300 includes a shutter operation control 302. The shutter operation control 302 further includes a shutter button 304, and a time-setting region 306 outside the shutter button 304. In the example illustrated in FIG. 3, the time-setting region 306 has five subregions.

In step 204, the terminal detects one or more selected subregions in the time-setting region.

In one exemplary embodiment, the time-setting region is an annular region and includes a preset number of subregions. Each subregion may be used for a rotary touch operation, so that any subregion rotatively touched will be selected. Thus, the detecting of the one or more selected subregions in the time-setting region may further include: detecting a rotary touch operation on the annular region; and determining the one or more selected subregions in the annular region according to the detected rotary touch operation.

Because of the characteristics of rotary touch operations, multiple subregions selected by a rotary touch operation are generally successive subregions. Therefore, the multiple selected subregions detected during each time-delay photographing are generally successive subregions, although the number of the selected subregions may be different.

In one exemplary embodiment, the terminal may also discriminatively display the one or more selected subregions and the unselected subregion(s) in the time-setting region, so that the user can visually distinguish the one or more selected subregions from the unselected subregion(s). One way for the discriminative displaying is using different colors. For example, the terminal may display the one or more selected subregions in green and the unselected subregion(s) in red. Alternatively, the terminal may display the one or more selected subregions in black and the unselected subregion(s) in white.

Figure 4:
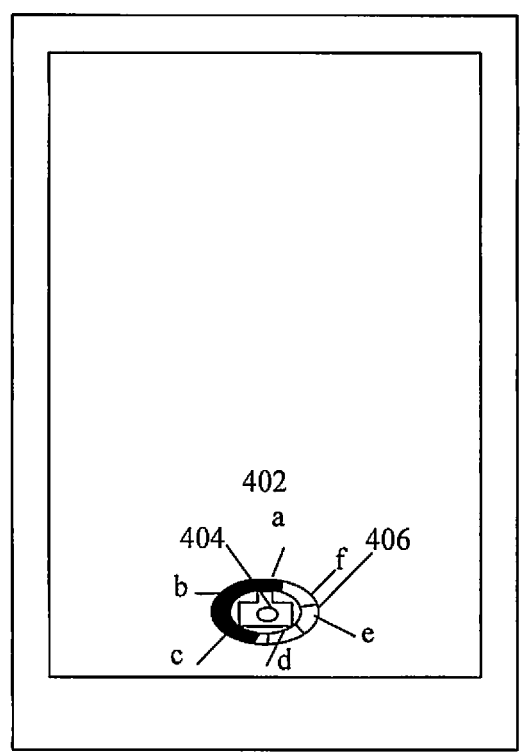
FIG. 4 is a schematic diagram illustrating a photographing interface, according to an exemplary embodiment.

FIG. 4 is a schematic diagram illustrating a photographing interface 400, according to an exemplary embodiment. Referring to FIG. 4, the photographing interface 400 includes a shutter operation control 402. The shutter operation control 402 further includes a shutter button 404, and a time-setting region 406 outside the shutter button 404. In the illustrated embodiment, the time-setting region 406 has six subregions, namely, subregions a-f. The terminal may be preset to display selected subregion(s) in black and unselected subregion(s) in white. For example, when detecting that the subregions a-c are selected, the terminal displays the subregions a-c in black, and the subregions d-f in white.

In step 206, the terminal determines a delay time for photographing according to the one or more selected subregions.

Since each subregion corresponds to a delay time, the terminal may determine the delay time for photographing according to the one or more selected subregions. For example, the delay time corresponding to each subregion may be preset to be 2 s. When detecting that three subregions in the time-setting region are selected, the terminal may determine the delay time for photographing to be 6 s. Similarly, when detecting that five subregions are selected, the terminal may determine the delay time to be 10 s.

In one exemplary embodiment, to visually show the current mode to the user, the terminal also displays the camera icon representing the photographing mode in the photographing interface. The camera icon may be displayed anywhere in the photographing interface. For example, the camera icon may be displayed at the upper left corner or upper right corner of the photographing interface.

Moreover, to visually show the determined delay time for photographing to the user, the terminal may display a time value of the delay time below the camera icon in the photographing interface.

Figure 5:
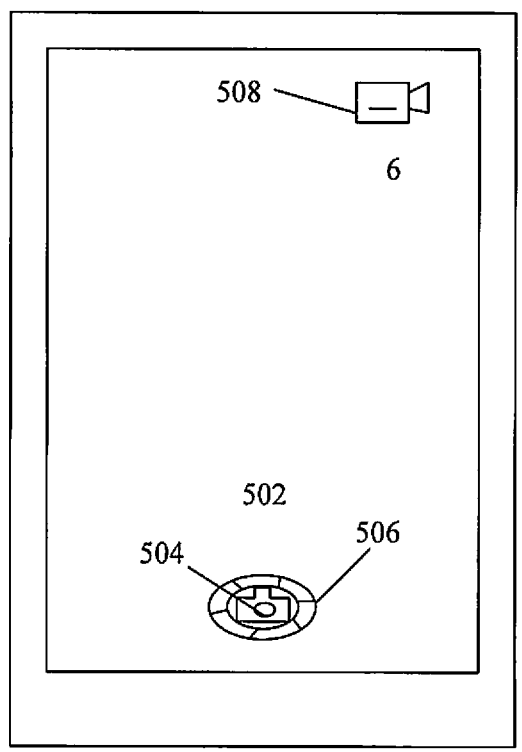
FIG. 5 is a schematic diagram illustrating a photographing interface, according to an exemplary embodiment.

FIG. 5 is a schematic diagram illustrating a photographing interface 500, according to an exemplary embodiment. Referring to FIG. 5, the photographing interface 500 includes a shutter operation control 502 and a camera icon 508. The shutter operation control 502 further includes a shutter button 504, and a time-setting region 506 outside the shutter button 504. In the example illustrated in FIG. 5, the camera icon 508 is displayed at the upper right corner of the photographing interface. When determining that the delay time is 6 s, the terminal displays the time value of the delay time, i.e., 6, below the camera icon 508.

In one exemplary embodiment, the shutter button is used for instantaneous photographing. Thus, when triggered by an operation selecting one or more subregions in the time-setting region, the terminal will change the shutter button into a countdown shutter button. The countdown shutter button is used for triggering photographing after the time delay.

Figure 6:
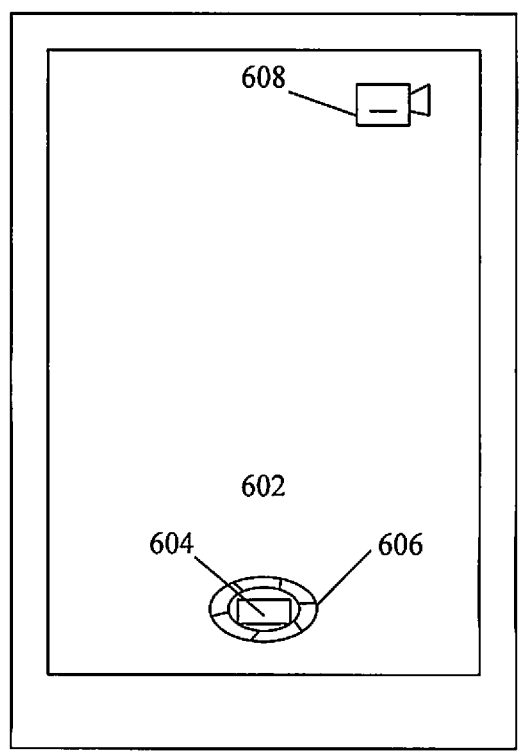
FIG. 6 is a schematic diagram illustrating a photographing interface, according to an exemplary embodiment.

FIG. 6 is a schematic diagram illustrating a photographing interface 600, according to an exemplary embodiment. Referring to FIG. 6, the photographing interface 600 includes a shutter operation control 602 and a camera icon 608. The shutter operation control 602 further includes a shutter button 604 and a time-setting region 606 outside the shutter button 604. The time-setting region 606 further includes multiple subregions. When the terminal detects that one or more subregions are selected, indicating that the user expects to perform time-delay photographing, the terminal will change the shutter button 604 into a countdown shutter button.

In step 208, the terminal performs photographing according to the delay time.

The terminal may count down the delay time from a current time, e.g., when the countdown shutter button is pressed, and photograph when the countdown ends. For example, when determining the delay time to be 10 s, the terminal takes the current time as the beginning to count down the delay time from 10 s to 0 s. The terminal performs photographing at 0 s.

In one exemplary embodiment, the counting down of the delay time from the current time further includes: gradually reducing the displayed time value of the delay time and the range of the one or more selected subregions till the countdown ends. Specifically, the time value of the delay time displayed in the photographing interface and the one or more selected subregions in the time-setting region represent the delay time for photographing. The delay time is gradually shortened as the delay time is counted down. Thus, to show the current delay time for photographing to the user, the displayed time value of the delay time and the range of the one or more selected subregions are gradually reduced accordingly. For example, if the terminal detects two subregions in the time-setting region are selected and determines the delay time to be 4 s, when the delay time is counted down to 2 s, the terminal changes the time value of the delay time displayed below the camera icon into 2, and reduce the selected subregions into one subregion.

Figure 7:
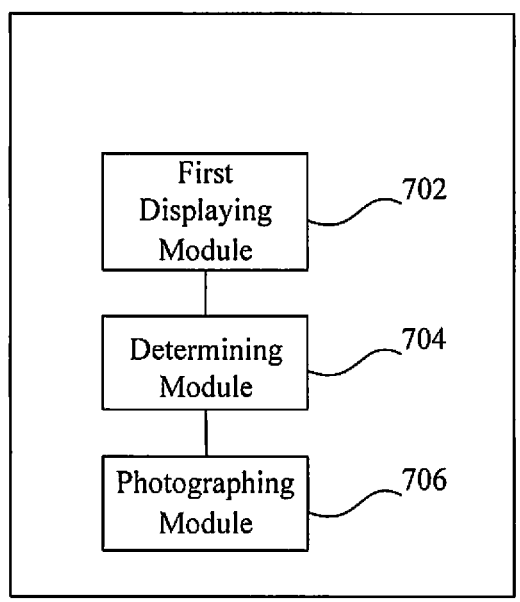
FIG. 7 is a block diagram of a device for time-delay photographing, according to an exemplary embodiment.

FIG. 7 is a block diagram of a device 700 for time-delay photographing, according to an exemplary embodiment. The device 700 may be used for performing the method 100 (FIG. 1) and method 200 (FIG. 2). Referring to FIG. 7, the device 700 includes a first displaying module 702, a determining module 704, and a photographing module 706.

The first displaying module 702 is configured to display a photographing interface. The photographing interface may include a shutter operation control. The shutter operation control may further include a shutter button and a time-setting region outside the shutter button.

The determining module 704 is configured to determine a delay time for photographing according to the time-setting region.

The photographing module 706 is configured to photograph according to the delay time.

In exemplary embodiments, the time-setting region includes a preset number of subregions, and each subregion corresponds to a delay time. The determining module 704 may further include a detecting unit and a determining unit (not shown). The detecting unit is configured to detect one or more selected subregions in the time-setting region. The determining unit is configured to determine the delay time according to the time-setting region.

In one exemplary embodiment, the time-setting region in the photographing interface displayed by the first display module is an annular region surrounding the outside of the shutter button. The detecting unit may include a detecting subunit and a determining subunit (not shown). The detecting subunit is configured to detect a rotary touch operation on the annular region. The determining subunit is configured to determine the one or more selected subregions in the annular region according to the detected rotary touch operation.

In one exemplary embodiment, the device 700 further includes a second displaying module (not shown). The second displaying module is configured to discriminatively display the one or more selected subregions and the unselected subregion(s) in the time-setting region.

In one exemplary embodiment, the photographing interface further includes a camera icon. The device 700 may include a third displaying module (not shown). The third displaying module is configured to display a time value of the delay time below the camera icon in the photographing interface.

In one exemplary embodiment, the photographing module 706 includes a timing unit and a photographing unit (not shown). The timing unit is configured to count down the delay time from a current time. For example, the timing unit may be configured to gradually reduce the displayed time value of the delay time for photographing and the range of the one or more selected subregions in the time-setting region till the countdown ends. The photographing unit is configured to photograph when the countdown ends.

Figure 8:
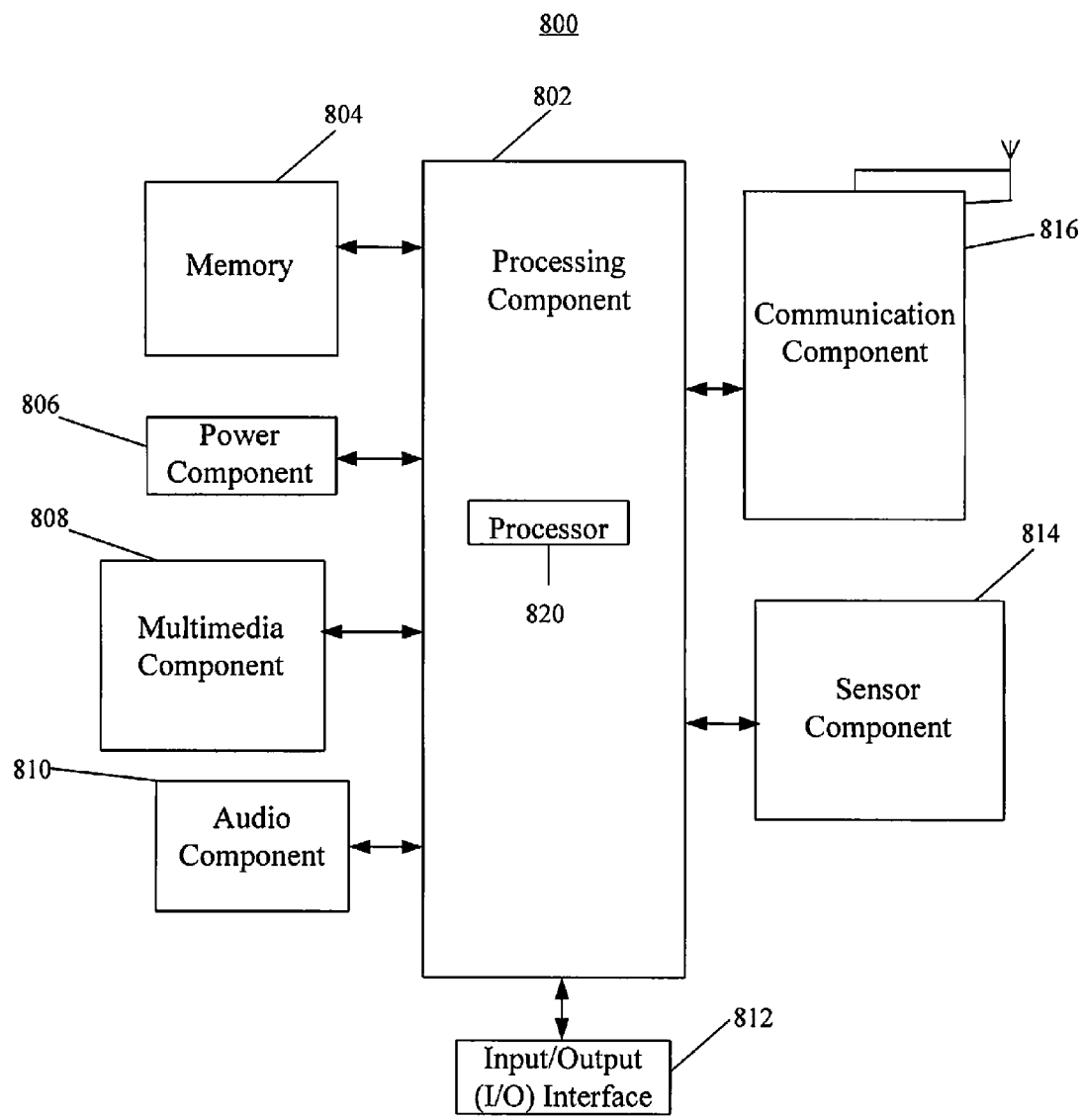
FIG. 8 is a block diagram of a device for time-delay photographing, according to an exemplary embodiment.

FIG. 8 is a block diagram of a device 800, according to an exemplary embodiment. For example, the device 800 may be a mobile phone, a computer, a digital broadcast terminal, a messaging device, a gaming console, a tablet, a medical device, exercise equipment, a personal digital assistant, and the like.

Referring to FIG. 8, the device 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the device 800, such as the operations associated with display, telephone calls, data communications, camera operations, and recording operations. The processing component 802 may include one or more processors 820 to execute instructions to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the device 800. Examples of such data include instructions for any applications or methods operated on the device 800, contact data, phonebook data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the device 800. The power component 806 may include a power management system, one or more power sources, and any other components associated with the generation, management, and distribution of power in the device 800.

The multimedia component 808 includes a screen providing an output interface between the device 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. The front camera and/or the rear camera may receive an external multimedia datum while the device 800 is in an operation mode, such as a photographing mode or a video mode. Each of the front camera and the rear camera may be a fixed optical lens system or may have focus and optical zoom capability.

The audio component 810 is configured to output and/or input audio signals. For example, the audio component 810 includes a microphone configured to receive an external audio signal when the device 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the device 800. For instance, the sensor component 814 may detect an open/closed status of the device 800, relative positioning of components, e.g., the display and the keypad, of the device 800, a change in position of the device 800 or a component of the device 800, a presence or absence of user contact with the device 800, an orientation or an acceleration/deceleration of the device 800, and a change in temperature of the device 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an acceleration sensor, a gyroscope sensor, a magnetic sensor, a pressure sensor, or a temperature sensor.

The communication component 816 is configured to facilitate communication, wired or wirelessly, between the device 800 and other devices. The device 800 can access a wireless network based on a communication standard, such as WiFi, 2G, 3G, or a combination thereof. In one exemplary embodiment, the communication component 816 receives a broadcast signal or broadcast related information from an external broadcast management system via a broadcast channel. In another exemplary embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer readable storage medium including instructions, such as included in the memory 804, executable by the processor 820 in the device 800, for performing the above-described methods. For example, the non-transitory computer-readable storage medium may be a ROM, a random access memory (RAM), a CD-ROM, a magnetic tape, a floppy disc, an optical data storage device, and the like.

One of ordinary skill in the art will understand that the above described modules/units can each be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention should only be limited by the appended claims.

What is claimed is:

1. A method for performing time-delay photographing, comprising:
    displaying a photographing interface including a shutter operation control, wherein the shutter operation control further includes a shutter button and a time-setting region outside the shutter button, the time-setting region including a preset number of subregions and each subregion representing a delay time;

determining a delay time for photographing according to the time-setting region, wherein the determining of the delay time includes:
detecting one or more selected subregions in the time-setting region; and
determining the delay time for photographing according to a number of the one or more selected subregions and the delay time represented by each of the one or more selected subregions; and
photographing according to the determined delay time.

2. The method according to claim 1, further comprising:
displaying discriminatively the one or more selected subregions and an unselected subregion in the time-setting region.

3. The method according to claim 1, wherein the photographing interface further includes a camera icon, the method further comprising:
displaying a time value of the delay time below the camera icon in the photographing interface.

4. The method according to claim 1, wherein the photographing according to the delay time comprises:
counting down the delay time from a current time; and
photographing when the countdown ends.

5. The method according to claim 4, wherein the counting down of the delay time from the current time further comprises:
reducing gradually a displayed time value of the delay time and a range of the one or more selected subregions in the time-setting region till the countdown ends.

6. The method according to claim 1, wherein the time-setting region is an annular region surrounding the shutter button.

7. The method according to claim 6, wherein the determining of the delay time according to the time-setting region further comprises:
detecting a rotary touch operation on the annular region; and
determining the one or more selected subregions in the annular region according to the detected rotary touch operation.

8. A device, comprising:
a processor; and
a memory for storing instructions executable by the processor;
wherein the processor is configured to:
display a photographing interface including a shutter operation control, wherein the shutter operation control further includes a shutter button and a time-setting region outside the shutter button, the time-setting region including a preset number of subregions and each subregion representing a delay time;
determine a delay time for photographing according to the time-setting region, wherein the determining of the delay time includes:
detecting one or more selected subregions in the time-setting region; and
determining the delay time for photographing according to a number of the one or more selected subregions and the delay time represented by each of the one or more selected subregions; and
photograph according to the determined delay time.

9. The device according to claim 8, wherein the processor is further configured to:
display discriminatively the one or more selected subregions and an unselected subregion in the time-setting region.

10. The device according to claim 8, wherein the photographing interface further includes a camera icon, the processor being further configured to:
display a time value of the delay time below the camera icon in the photographing interface.

11. The device according to claim 8, wherein the processor is further configured to:
count down the delay time from a current time; and
photograph when the countdown ends.

12. The device according to claim 11, wherein the processor is further configured to:
reduce gradually a displayed time value of the delay time and a range of the one or more selected subregions in the time-setting region till the countdown ends.

13. The device according to claim 8, wherein the time-setting region is an annular region surrounding the shutter button.

14. The device according to claim 13, wherein the processor is further configured to:
detect a rotary touch operation on the annular region; and
determine the one or more selected subregions in the annular region according to the detected rotary touch operation.

15. A non-transitory computer-readable storage medium storing instructions that, when executed by a processor of a device, cause the device to perform a method for time-delay photographing, the method comprising:
displaying a photographing interface including a shutter operation control, wherein the shutter operation control further includes a shutter button and a time-setting region outside the shutter button, the time-setting region including a preset number of subregions and each subregion representing a delay time;
determining a delay time for photographing according to the time-setting region, wherein the determining of the delay time includes:
detecting one or more selected subregions in the time-setting region; and
determining the delay time for photographing according to a number of the one or more selected subregions and the delay time represented by each of the one or more selected subregions; and
photographing according to the determined delay time.

16. The medium of claim 15, wherein the method further comprises:
displaying discriminatively the one or more selected subregions and an unselected subregion in the time-setting region.

17. The medium of claim 15, wherein the photographing according to the delay time comprises:
counting down the delay time from a current time; and
photographing when the countdown ends.

* * * * *